US012233698B2

(12) United States Patent
Bell et al.

(10) Patent No.: US 12,233,698 B2
(45) Date of Patent: Feb. 25, 2025

(54) STRUCTURAL ASSEMBLY AND VEHICLE HAVING STRUCTURAL ASSEMBLY

(71) Applicant: Ford Global Technologies, LLC, Dearborn, MI (US)

(72) Inventors: Scott J. Bell, Northville, MI (US); Vladimir Vladimirovich Bogachuk, West Bloomfield, MI (US); Shawn Michael Morgans, Chelsea, MI (US); Robert Reiners, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 17/878,392

(22) Filed: Aug. 1, 2022

(65) Prior Publication Data

US 2024/0034138 A1    Feb. 1, 2024

(51) Int. Cl.
*B60K 1/04*      (2019.01)
*H01M 50/249*    (2021.01)

(52) U.S. Cl.
CPC ............. *B60K 1/04* (2013.01); *H01M 50/249* (2021.01); *B60K 2001/0438* (2013.01); *H01M 2220/20* (2013.01)

(58) Field of Classification Search
CPC ............. B60K 1/04; B60K 2001/0438; H01M 2220/20; B62D 21/15; B62D 21/157; B62D 21/04
See application file for complete search history.

(56) References Cited

U.S. PATENT DOCUMENTS

| 5,085,485 | A | * | 2/1992 | Wurl | .......................... E04C 3/06 52/843 |
| 7,441,830 | B2 | | 10/2008 | Caliskan et al. | |
| 9,499,205 | B1 | * | 11/2016 | Elia | .......................... B60K 6/28 |
| 2006/0043659 | A1 | * | 3/2006 | Gofron | .................... F16F 9/58 267/220 |
| 2021/0300476 | A1 | | 9/2021 | Gonzalez Mendivil et al. | |

FOREIGN PATENT DOCUMENTS

| CN | 106005015 | 10/2016 |
| CN | 213676352 | 7/2021 |

* cited by examiner

*Primary Examiner* — Jason D Shanske
*Assistant Examiner* — James J Triggs
(74) *Attorney, Agent, or Firm* — Burris Law, PLLC

(57) ABSTRACT

A structural assembly for a vehicle includes a vehicle frame distinct from a vehicle body. The vehicle frame includes opposed longitudinal rails. Each rail includes a single, monolithic body having a central internal brace and a pair of opposed ends. One end of the opposed ends is fixed to a first side of the central internal brace and the other end of the opposed ends is fixed to a second side of the central internal brace that is opposite the first side.

20 Claims, 6 Drawing Sheets

STRUCTURAL ASSEMBLY AND VEHICLE HAVING STRUCTURAL ASSEMBLY

FIELD

The present disclosure relates to a structural assembly and a vehicle having a structural assembly.

BACKGROUND

The statements in this section merely provide background information related to the present disclosure and may not constitute prior art.

In general, electric vehicles differ from conventional motor vehicles because they are driven by one or more rechargeable battery packs having lithium-ion batteries, for example, or any other suitable electrical power storage units. The battery pack typically powers one or more motors to drive a set of wheels. The size and weight of the battery pack is typically greater for electric vehicles capable of traveling long distances (e.g., electric vehicles capable of traveling more than 500 miles). Depending on the mounting location relative to the electric vehicle, the battery pack may be susceptible to various vehicle loads.

Integration of rechargeable battery packs into the structure of existing vehicles and providing efficient load paths in a variety of operating conditions can be challenging, primarily due to the increased weight of the battery packs and their larger footprint in the vehicle. The present disclosure addresses opportunities related to the integration of rechargeable battery packs in electric vehicles.

SUMMARY

This section provides a general summary of the disclosure and is not a comprehensive disclosure of its full scope or all of its features.

In one form, the present disclosure discloses a structural assembly for a vehicle that includes a battery structure including a battery frame. The structural assembly comprises a vehicle frame distinct from a vehicle body. The vehicle frame includes opposed longitudinal rails. Each rail comprises a single, monolithic body having a central internal brace and a pair of opposed ends. One end of the opposed ends is fixed to a first side of the central internal brace and the other end of the opposed ends is fixed to a second side of the central internal brace that is opposite the first side.

In variations of the structural assembly of the above paragraph, which may be implemented individually or in any combination: the single, monolithic body of each rail having the central internal brace and the pair of opposed ends is located at a mid-section of the vehicle frame; a plurality of mounts are secured to the single, monolithic body; the single, monolithic body comprises an upper wall and a lower wall, the central internal brace is disposed between the upper wall and the lower wall and is substantially parallel to the upper wall and the lower wall; the upper wall, the lower wall, and the central internal brace are configured to be substantially parallel to a level ground surface when the vehicle is on the level ground surface; the single, monolithic body includes a plurality of first walls defining a first cavity and a plurality of second walls defining a second cavity, the central internal brace acts as a partition between the first walls and the second walls; a plurality of mounts secured to the single, monolithic body and a plurality of jounce bumpers, each jounce bumper disposed on a respective mount and between the respective mount and the vehicle body; the vehicle frame does not include any cross members that span laterally to connect the monolithic bodies of the opposed rails; the opposed longitudinal rails are configured to be spaced apart from a respective side of the battery frame; and the first side of the central internal brace is an upper planar surface and the second side of the central internal brace is a lower planar surface.

In another form, the present disclosure discloses a structural assembly for a vehicle that includes a battery structure including a battery frame. The structural assembly comprises a vehicle body and a vehicle frame distinct from a vehicle body. The vehicle frame supports the vehicle body and includes opposed longitudinal rails. Each rail comprises a single, monolithic body having a central internal brace and a pair of opposed ends. One end of the opposed ends is fixed to a first side of the central internal brace and the other end of the opposed ends is fixed to a second side of the central internal brace that is opposite the first side. The single, monolithic body of each rail is located at a mid-section of the vehicle frame.

In variations of the structural assembly of the above paragraph, which may be implemented individually or in any combination: the vehicle body includes opposed rockers extending in a longitudinal direction of the vehicle, each opposed longitudinal rail is located between a respective rocker and the battery frame of the battery structure and the rockers overlap the opposed longitudinal rails.

In yet another form, the present disclosure discloses an electric vehicle comprising a battery structure including a battery frame, a vehicle body and a vehicle frame distinct from a vehicle body and supporting the vehicle body and the battery frame. The vehicle frame includes opposed longitudinal rails. Each rail comprises a single, monolithic body having a central internal brace and a pair of opposed ends. One end of the opposed ends is fixed to a first side of the central internal brace and the other end of the opposed ends is fixed to a second side of the central internal brace that is opposite the first side. The single, monolithic body further includes a plurality of first walls defining a first cavity and a plurality of second walls defining a second cavity. The central internal brace acts as a partition between the first walls and the second walls.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

DETAILED DESCRIPTION

Figure 1:
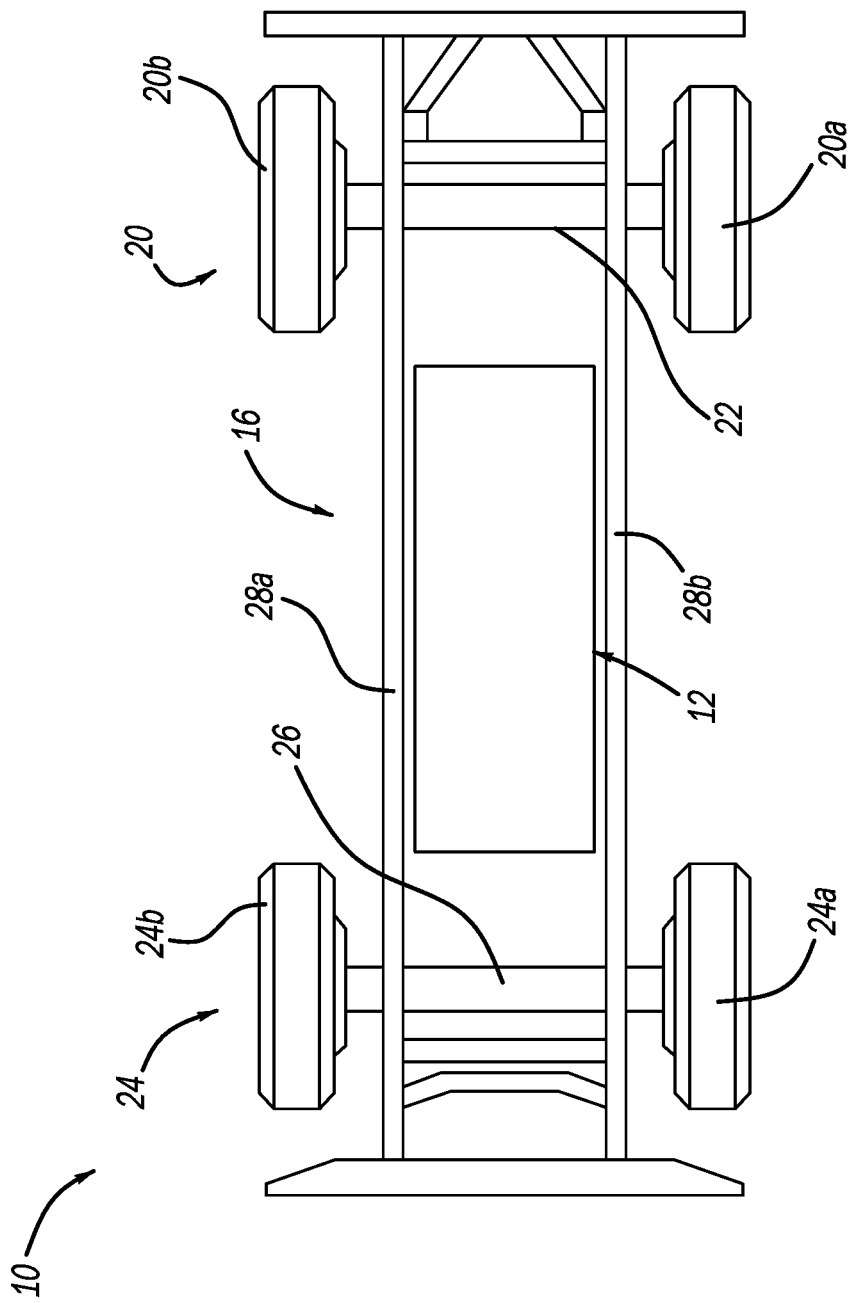
FIG. 1 is a schematic view of a vehicle including a structural assembly according to the principles of the present disclosure.

The following description is merely exemplary in nature and is not intended to limit the present disclosure, application, or uses. It should be understood that throughout the drawings, corresponding reference numerals indicate like or corresponding parts and features.

With reference to FIGS. 1-4, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle. The vehicle 10 includes a battery structure 12, a vehicle body 14 and a vehicle frame 16. The battery structure 12 may be rechargeable and may include lithium-ion batteries, solid-state batteries, or any other suitable electrical power storage units. The battery structure 12 may be disposed at various locations of the vehicle 10 and may be secured to the vehicle frame 16 via a battery pack support assembly 17. In this way, the battery structure 12 is supported by the vehicle frame 16 and is remote from a passenger cabin and cargo compartments (not shown) of the vehicle 10, therefore, not occupying space that would otherwise be available for passengers or cargo. The battery structure 12 includes an outer support frame 18. The battery structure 12 powers one or more motors to drive a set of drive wheels. For example, the battery structure 12 may power a rear motor (not shown) to drive rear wheels 20a, 20b of a set of rear wheels 20 via a rear axle 22 and/or may power a front motor (not shown) to drive front wheels 24a, 24b of a set of front wheels 24 via a front axle 26.

The vehicle body 14 is separate (distinct) from and mounted on the vehicle frame 16. Stated differently, the vehicle body 14 is mounted on a plurality of mounts 34 secured to the vehicle frame 16. Jounce bumpers may be disposed on a respective mount 34 and between the respective mount 34 and the vehicle body 14. The vehicle body 14 includes cross members 35 (FIGS. 2 and 3) extending above the vehicle frame 16 and the battery structure 12.

Figure 2:
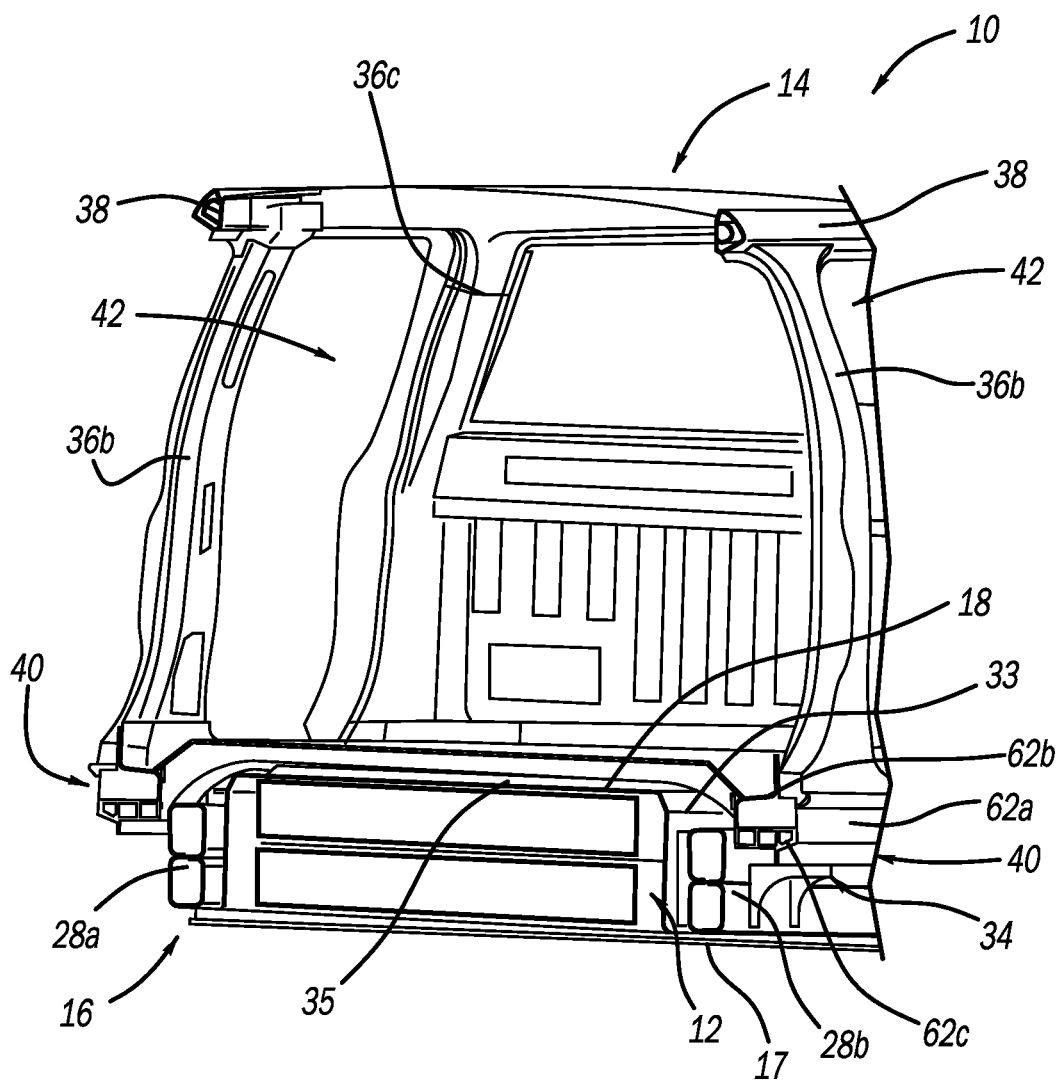
FIG. 2 is a cross-sectional perspective view of a vehicle frame and a vehicle body of the vehicle of FIG. 1.

With reference to FIG. 2, the vehicle body 14 also includes a front end (not shown), a plurality of pillars (e.g., A-pillars (not shown), B-pillars 36b, C-pillars 36c (one of which is shown), hinge pillars (not shown)), roof rails 38, and rockers 40. In one example, the front end includes a bumper (not shown), a pair of opposed beams or inner rails (not shown), and a pair of opposed upper rails (not shown). The bumper extends in a transverse direction relative to a longitudinal direction of the vehicle 10 and is secured to the vehicle frame 16 by energy absorbing members.

The A-pillars, the B-pillars 36b, the C-pillars 36c, the hinge pillars, the rockers 40 and the roof rails 38 cooperate to define door openings 42 in the vehicle body 14. Doors (not shown) are rotatably coupled to the hinge pillars to move between a closed position (not shown) in which the doors are disposed within the door openings 42 and an open position (not shown) in which the doors are removed from the door openings 42.

Each rocker 40 is elongated and extends along the longitudinal direction of the vehicle 10. Each rocker 40 is spaced apart from the respective opposed longitudinal rail 28a, 28b. A front end of the rocker 40 is housed within or otherwise secured to a respective hinge pillar (i.e., the front end of the rocker 40 may be disposed within a cavity of the respective hinge pillar).

The rocker 40 includes an outer member 62a, the inner member 62b, and an inner rocker 62c. The outer member 62a is secured to the inner member 62b via welding. In some configurations, the outer member 62a is secured to the inner member 62b with mechanical fasteners. The inner rocker 62c is housed within a cavity formed via the outer and inner members 62a, 62b. In the example provided, the inner rocker 62c extends along (e.g., contacts) an inboard portion of the outer member 62a, though other configurations can be used.

Figure 5:
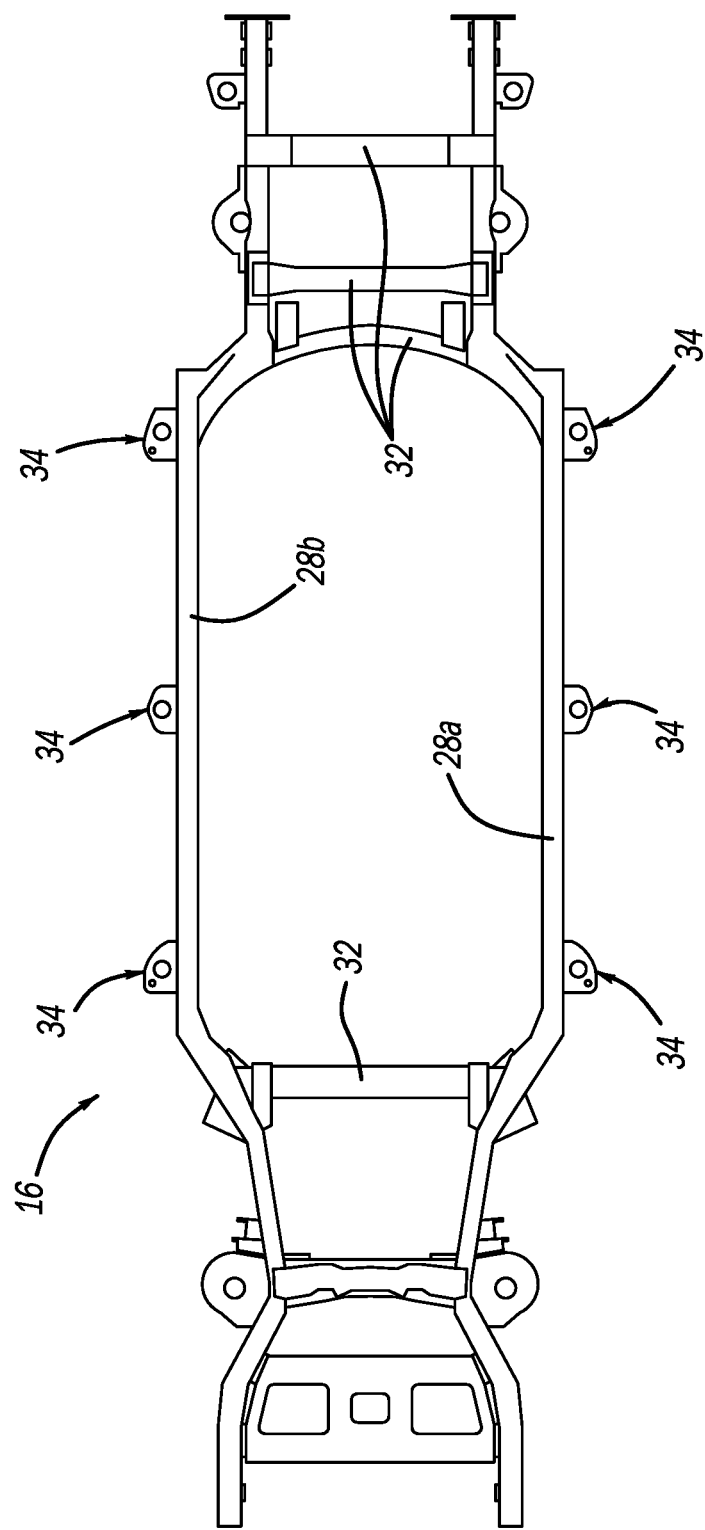
FIG. 5 is a bottom view of the vehicle frame of the vehicle of FIG. 1.
Figure 6:
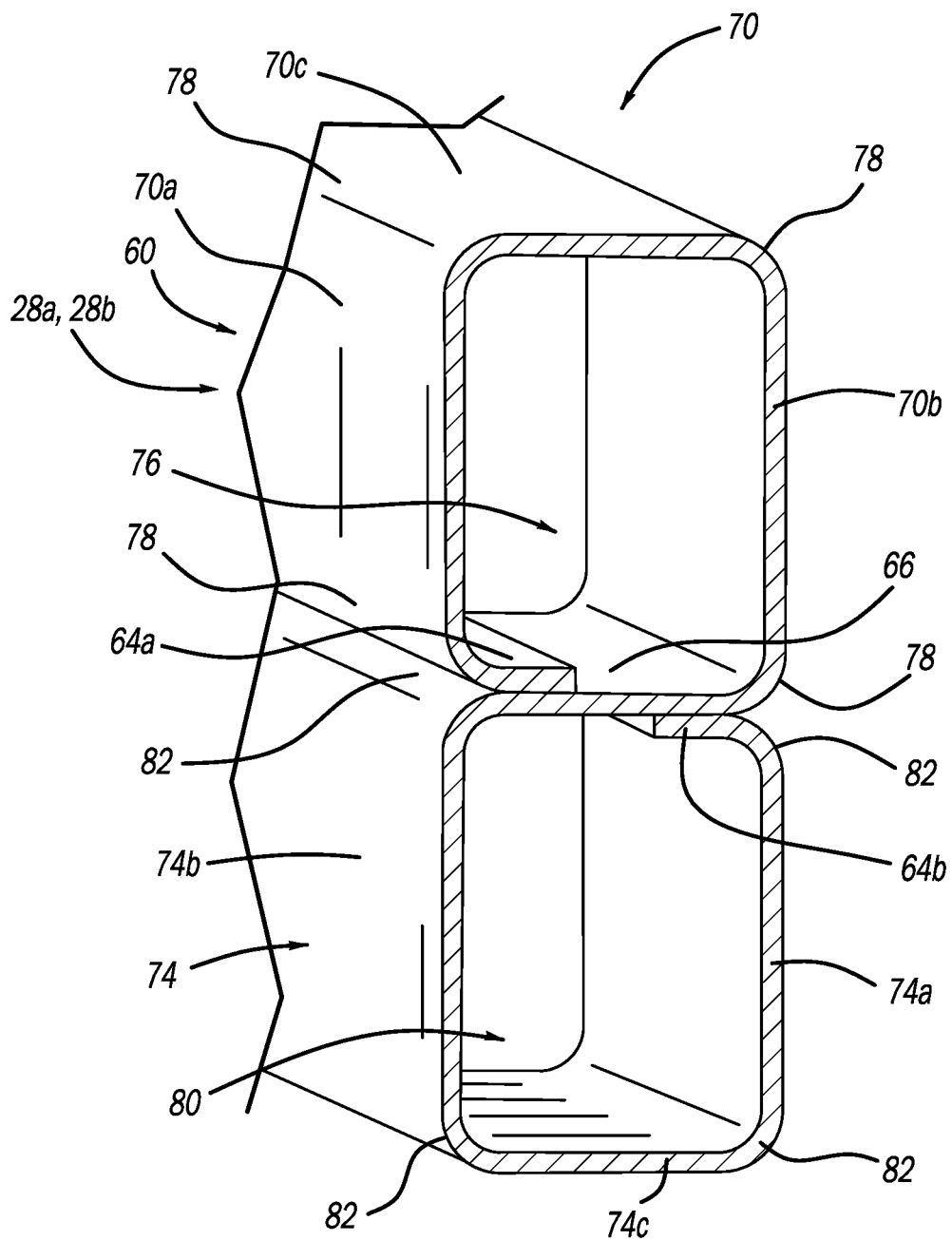
FIG. 6 is a cross-sectional perspective view of one side rail of the vehicle frame of FIG. 2.

With additional reference to FIGS. 5 and 6, the vehicle frame 16 is made of a metal material such as steel, for example, and may be manufactured by a roll forming process, for example. The vehicle frame 16 is the main supporting structure of the vehicle 10, to which various components are attached either directly or indirectly. For example, a suspension system 30 (FIG. 4) is secured to the vehicle frame 16, and secures the wheels 20, 24 (FIG. 1) of the vehicle 10 to the vehicle frame 16. The suspension system 30 provides a smooth ride by absorbing energy from various road bumps while driving, and assists the wheels 20, 24 to remain in contact with the road by increasing wheel friction. The suspension system 30 includes various components such as upper and lower control arms, springs, shock absorbers, struts, and ball joints, for example.

The vehicle frame 16 includes the opposed longitudinal rails 28a, 28b and cross members 32. The rails 28a, 28b are spaced apart from each other and may establish a length of the vehicle frame 16. The rails 28a, 28b are also spaced apart from a respective side 33 of the outer support frame 18. In this way, components such as electrical conduits, for example, may extend along and between the outer support frame 18 and the rails 28a, 28b. The cross members 32 connect the rails 28a, 28b to each other.

The suspension system 30 may be secured to the rails 28a, 28b and/or the cross members 32. As shown in FIG. 5, the vehicle frame 16 does not include cross members at a center portion or mid-section thereof to accommodate the battery structure 12. As shown in FIG. 5, the rails 28a, 28b are spaced apart a greater distance at the center portion of the vehicle frame 16 than at the ends of the vehicle frame 16.

The plurality of mounts 34 are secured to and along a respective rail 28a, 28b of the vehicle frame 16 at or near the center portion of the vehicle frame 16. Each rail 28a, 28b is located between a respective rocker 40 and the outer support frame 18 of the battery structure 12. As used herein, the center portion or mid-section of the vehicle frame 16 means the region of the vehicle frame 16 where single, monolithic bodies 60 of the rails 28a, 28b are substantially parallel and that is forward a location where the opposed longitudinal rails 28a, 28b angle inboard proximate a rear of the vehicle and rearward a location where the opposed longitudinal rails 28a, 28b angle inboard proximate a front of the vehicle 10. The battery structure 12 is secured to the vehicle frame 16 at the center portion.

Each rail 28a, 28b includes the single, monolithic body 60 formed into a predetermined geometric shape. In the example illustrated, the body 60 has a uniform thickness and the geometric shape is generally in the form of the number eight (8). The end 64a is fixed (i.e., welded) to an upper planar surface of the central internal brace 66 and the end 64b is fixed (i.e., welded) to a lower planar surface of the central internal brace 66 that is opposite the upper surface. The ends 64a, 64b are also fixed to opposing sides of the central internal brace 66. That is, the end 64a is fixed to a left side of the central internal brace 66 and the end 64b is fixed to a right side of the central internal brace 66. In some forms, the end 64a is fixed to an upper right side of the central internal brace 66 and the end 64b is fixed to a lower left side of the central internal brace 66.

The central internal brace 66 extends in a transverse direction relative to the longitudinal direction of the vehicle 10 and acts as a partition between a plurality of walls 70 (comprising side walls 70a, 70b and upper wall 70c) forming a rectangular or square shaped upper portion of the body 60 and a plurality of walls 74 (comprising side walls 74a, 74b and lower wall 74c) forming a rectangular or square shaped lower portion of the body 60.

The side walls 70a, 70b extend in a vertical direction and the upper wall 70c extends in a horizontal direction (a transverse direction relative to the longitudinal direction of the vehicle 10). The walls 70, the central internal brace 66, and the end 64a define a cavity 76 that is sealed along the periphery (i.e., the rectangular shaped outer profile forming the cavity 76 is sealed). In the example illustrated, the body 60 is formed such that radii 78 are included between two adjacent walls 70a, 70b, 70c, between the central internal brace 66 and the side wall 70b, and between the end 64a and the side wall 70a.

The side walls 74a, 74b extend in a vertical direction and the lower wall 74c extends in a horizontal direction (in a transverse direction relative to the longitudinal direction of the vehicle 10). The walls 74, the central internal brace 66, and the end 64b define a cavity 80 that is sealed along the periphery (i.e., the rectangular shaped outer profile forming the cavity 80 is sealed). In the example illustrated, the body is formed such that radii 82 are included between two adjacent walls 74a, 74b, 74c, between the central internal brace 66 and the side wall 74b, and between the end 64b and the side wall 74a. The central internal brace 66 is substantially parallel to the upper wall 70c and the lower wall 74c.

Figure 3:
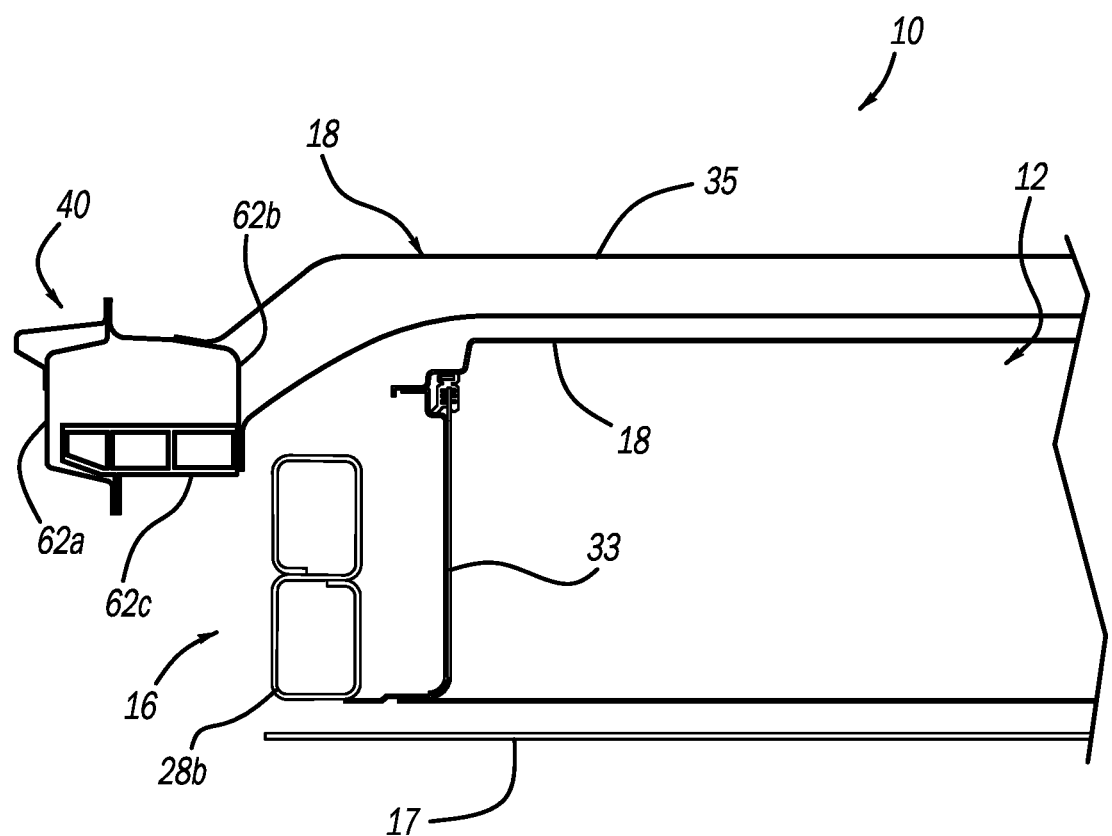
FIG. 3 is a cross-sectional view of a portion of the vehicle frame and the vehicle body of the vehicle of FIG. 1.
Figure 4:
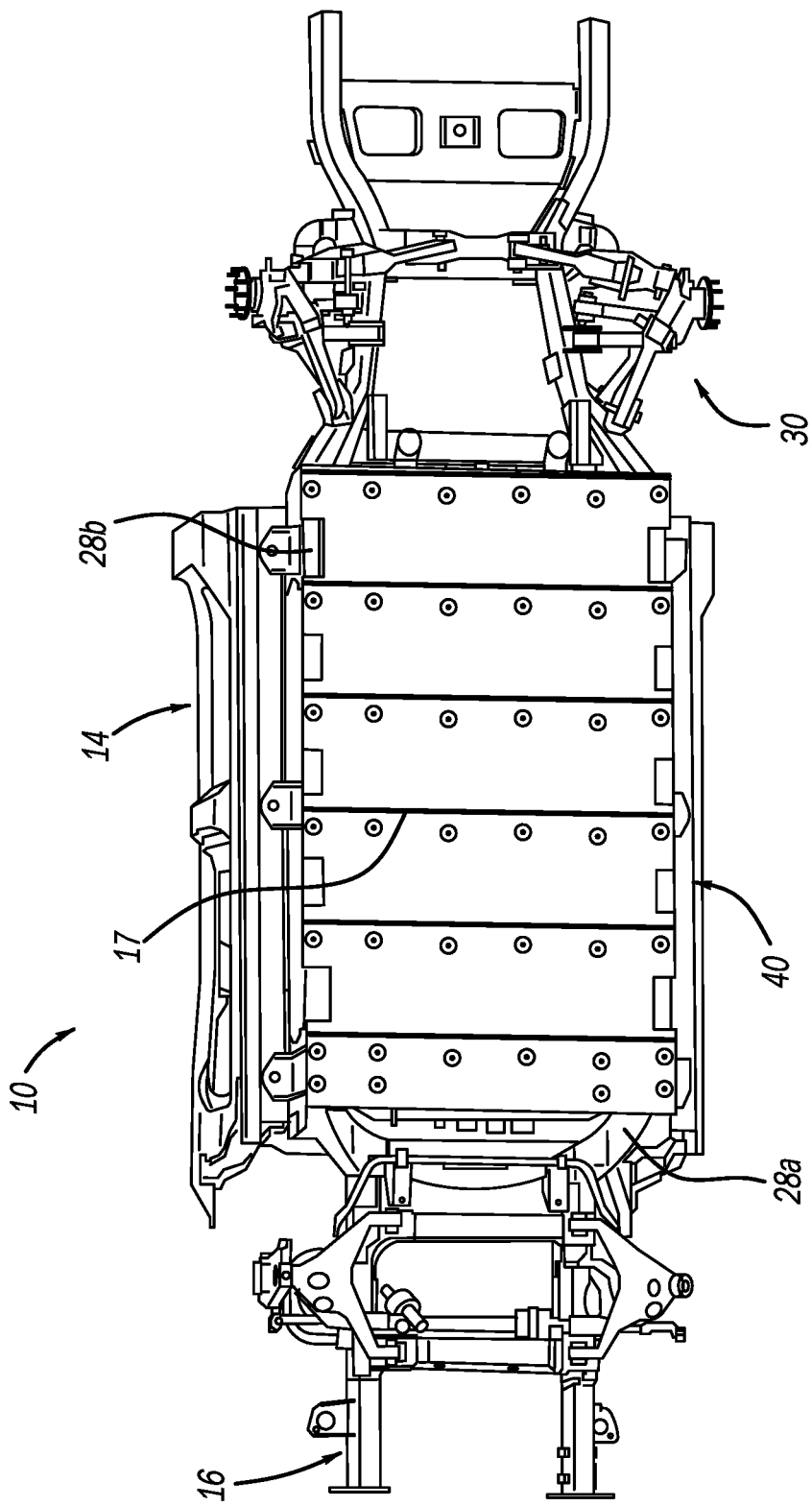
FIG. 4 is a bottom view of the vehicle frame and the vehicle body of the vehicle of FIG. 1.

As shown in FIG. 3, each rail 28a, 28b is positioned such that it is inboard of and overlapped by a corresponding rocker 40. In other words, a bottom of each rocker 40 is outboard of and below the upper wall 70c (labeled in FIG. 6) of each rail 28a, 28b.

A structural assembly of the present disclosure comprises the vehicle frame 16 and the vehicle body 14. The rockers 40 being spaced apart from the respective opposed longitudinal rail 28a, 28b and overlapping the respective opposed longitudinal rail 28a, 28b provides improved load paths for distributing loads during a vehicle impact event. Furthermore, the rails 28a, 28b having a mid-section (the section of the rails 28a, 28b located at opposing sides of the battery structure 12) including the disclosed geometric shape improves the strength and stiffness of the rails 28a, 28b.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural assembly for a vehicle including a battery structure including a battery frame, the structural assembly comprising:
   a vehicle frame distinct from a vehicle body, the vehicle frame including opposed longitudinal rails, each rail comprising a single, monolithic body having a central internal brace and a pair of opposed ends, one end of the opposed ends fixed to an upper, planar surface at a first side of the central internal brace and the other end of the opposed ends fixed to a lower, planar surface at a second side of the central internal brace that is opposite the first side.

2. The structural assembly of claim 1, wherein the single, monolithic body of each rail having the central internal brace and the pair of opposed ends is located at a mid-section of the vehicle frame.

3. The structural assembly of claim 2, further comprising a plurality of mounts secured to the single, monolithic body.

4. The structural assembly of claim 1, wherein the single, monolithic body comprises an upper wall and a lower wall, and wherein the central internal brace is disposed between the upper wall and the lower wall and is substantially parallel to the upper wall and the lower wall.

5. The structural assembly of claim 4, wherein the upper wall, the lower wall, and the central internal brace are configured to be substantially parallel to a level ground surface when the vehicle is on the level ground surface.

6. The structural assembly of claim 1, wherein the single, monolithic body includes a plurality of first walls defining a first cavity and a plurality of second walls defining a second cavity, and wherein the central internal brace acts as a partition between the first walls and the second walls.

7. The structural assembly of claim 1, further comprising:
   a plurality of mounts secured to the single, monolithic body; and
   a plurality of jounce bumpers, each jounce bumper disposed on a respective mount and between the respective mount and the vehicle body.

8. The structural assembly of claim 1, wherein the vehicle frame does not include any cross members that span laterally to connect the monolithic bodies of the opposed rails.

9. The structural assembly of claim 1, wherein the opposed longitudinal rails are configured to be spaced apart from a respective side of the battery frame.

10. A structural assembly for a vehicle including a battery structure including a battery frame, the structural assembly comprising:
    a vehicle body; and
    a vehicle frame distinct from the vehicle body and supporting the vehicle body, the vehicle frame having opposed longitudinal rails, each rail comprising a single, monolithic body having a central internal brace and a pair of opposed ends, one end of the opposed ends fixed to an upper, planar surface at a first side of the central internal brace and the other end of the opposed ends fixed to a lower, planar surface at a second side of the central internal brace that is opposite the first side, wherein the single, monolithic body of each rail is located at a mid-section of the vehicle frame.

11. The structural assembly of claim 10, further comprising a plurality of mounts secured to the single, monolithic body.

12. The structural assembly of claim 10, wherein the single, monolithic body comprises an upper wall and a lower wall, and wherein the central internal brace is disposed between the upper wall and the lower wall and is substantially parallel to the upper wall and the lower wall.

13. The structural assembly of claim 12, wherein the upper wall, the lower wall, and the central internal brace are configured to be substantially parallel to a level ground surface when the vehicle is on the level ground surface.

14. The structural assembly of claim 10, wherein the single, monolithic body includes a plurality of first walls defining a first cavity and a plurality of second walls defining a second cavity, and wherein the central internal brace acts as a partition between the first walls and the second walls.

15. The structural assembly of claim 10, further comprising:
a plurality of mounts secured to the single, monolithic body; and
a plurality of jounce bumpers, each jounce bumper disposed on a respective mount and between the respective mount and the vehicle body.

16. The structural assembly of claim 10, wherein the vehicle body includes opposed rockers extending in a longitudinal direction of the vehicle, each opposed longitudinal rail is located between a respective rocker and the battery frame of the battery structure.

17. The structural assembly of claim 16, wherein the rockers overlap the opposed longitudinal rails.

18. The structural assembly of claim 10, wherein the vehicle frame does not include any cross members that span laterally to connect the monolithic bodies of the opposed rails.

19. An electric vehicle comprising:
a battery structure including a battery frame;
a vehicle body; and
a vehicle frame distinct from the vehicle body and supporting the vehicle body and the battery frame, the vehicle frame having opposed longitudinal rails, each rail comprising a single, monolithic body having a central internal brace and a pair of opposed ends, one end of the opposed ends fixed to an upper, planar surface at a first side of the central internal brace and the other end of the opposed ends fixed to a lower, planar surface at a second side of the central internal brace that is opposite the first side,
wherein the single, monolithic body further includes a plurality of first walls defining a first cavity and a plurality of second walls defining a second cavity, the central internal brace acts as a partition between the first walls and the second walls.

20. The electric vehicle of claim 19, further comprising a plurality of mounts secured to the single, monolithic body.

* * * * *